United States Patent [19]
Gagnon

[11] 4,140,876

[45] Feb. 20, 1979

[54] COMPRESSED SPEECH SYSTEM AND PREDICTOR

[75] Inventor: Richard T. Gagnon, Rochester, Mich.

[73] Assignee: Scitronix Corp., Ann Arbor, Mich.

[21] Appl. No.: 891,242

[22] Filed: Mar. 29, 1978

Related U.S. Application Data

[62] Division of Ser. No. 834,642, Sep. 19, 1977.

[51] Int. Cl.[2] ........................ G10L 1/00; H04M 11/00

[52] U.S. Cl. ................................ 179/1 SC; 179/1 SA

[58] Field of Search ................ 179/1 SA, 1 SC, 1 SB, 179/1 SD

[56] References Cited

U.S. PATENT DOCUMENTS 3,662,115 5/1972 Saito et al. ........................ 179/1 SC

OTHER PUBLICATIONS

H. Haynes et al., "Speech Investigation Apparatus", RCA Tech. Notes, T.N. 632, Aug. 1965.

*Primary Examiner*—Kathleen H. Claffy
*Assistant Examiner*—E. S. Kemeny
*Attorney, Agent, or Firm*—Krass & Young

[57] ABSTRACT

A predictor compressed speech system comprising a residual encoder for transmitting or storing a digitized speech signal having one bit of resolution is disclosed. An original speed waveform may be reconstituted from the digitized signal to produce synthesized speech without the use of a vocal tract analog. The digitized signal is produced by generating a remainder or error signal between the original input signal and its predicted value. A predictor comprises an analog delay line in the form of a series of sample and hold modules, the outputs of which feed a corresponding series of correlation multipliers. The summed outputs of the correlation multipliers are an estimate of the next value of the input signal. This estimate is then fed back to the delay line unput, forming a recursive filter which is continuously tuned to match the correlation statistics of the input signal. Within the predictor, duty cycles which are necessary to generate the correlation coefficients are achieved through four-quadrant multiplication of an analog signal with the digital speech output of the system. The four quadrant multiplication is accomplished with analog gate pairs. Integrators having a finite DC gain are employed within the predictor to ensure lack of transmitter-receiver divergence and immunity from moderate bit errors in the bit stream driving the receiver. An absolute value detector scales the system to follow amplitude variations in the input signal.

2 Claims, 7 Drawing Figures

PRIOR ART VOCODER

COMPRESSED SPEECH SYSTEM AND PREDICTOR

This is a division of application Ser. No. 834,642, filed Sept. 19, 1977.

INTRODUCTION

The present invention relates to methods and apparatus for speech compression in general and specifically to adaptive residual encoders which employ relatively low cost analog circuitry and have output signals characterized by one bit of resolution.

BACKGROUND OF THE INVENTION

Past attempts to improve the transmission and storage of intelligence in electrical media have resulted in a number of well recognized techniques for processing human speech. One such technique is speech compression. The term "speech compression" as used herein, refers to a modulation technique based on certain properties, such as redundancy, of human speech to permit an electronic analog of a speech waveform to be transmitted over a narrower frequency band than otherwise would be necessary if the unmodulated signal were transmitted.

Bit rate and processor cost are prime concerns in the development of any compression system. Lowering the bit rate allows greater efficiencies in the storage and transmission of speech waveforms. However, bit rate reduction characteristically entails more expensive and complex processing, higher development costs and diminished voice quality. Naturalness of output refers to how human or synthetic the output utterances are subjectively judged. Some techniques, such as vocoders, are simply not capable of producing naturalness because they require vocal tract analogs to reconstitute the original speech signal.

A system found in the prior art employing speech compression is the formant vocoder. The vocoder breaks speech down into various parameters. The original incoming signal is thrown away and only the parameters are used. At the receiving or output end of such a system, a complete vocal tract analog is needed to reconstitute the original speech signal. Such systems produce synthetic sounding speech because of limitations in the various parameters and the limited number of such parameters. Additionally, processing cost is very high.

A channel vocoder splits the spectrum into frequency bands and the signal amplitude in each band is transmitted separately either via parallel transmission lines or on a single line by multiplexing techniques. At the reconstruction or receiver end, these amplitude signals control the outputs of a bank of filters. The forcing function going into the filters is a voiced or unvoiced signal derived from the original speech. Sometimes the excitation function in the original voice is actually sent as a pulse code modulation (PCM) signal. In this case, the system is called a baseband channel vocoder. Typically, these systems have the least naturalness, although they are fairly intelligible. Again, processing costs are very high. Some techniques of speech compression are good for bit reduction but offer improved memory costs only with no fidelity improvements. Also, other techniques exist which improve fidelity but are relatively uncapable of effecting any meaningful bit reduction.

BRIEF DESCRIPTION OF THE INVENTION

An object of the present invention is to provide a compressed speech system which incorporates the techniques of frequency compression/expansion and adaptive predictive encoding, resulting in the transmission of speech data in the form of a residual or error signal comprising a string of binary digits, each of which contains all of the parametric information necessary to reconstruct the original speech signal without a vocal tract analog.

In general, this is accomplished by a device which is technically known as a residual encoder. The residual which is encoded is the remainder between an original input signal and its predicted value. The predictor is a tunable recursive filter composed of low cost analog circuitry which anticipates and predicts the input signal. The input signal and the predicted signal are compared and their difference is converted in an analog to digital (A/D) converter to generate a synonymous error signal. The term "synonymous" as used herein refers to the signal which has been changed in form, but not in informational content such as A/D. This digital error signal is the "compressor" output containing all of the parametric information necessary to reconstruct the input signal. A local digital to analog converter also reads the output signal and reproduces the difference signal, which, along with the predicted signal, is used to reconstruct or reconstitute the original input signal. Finally, the predictor reads the reconstituted input signal as well as the output signal to generate the predicted signal. The "compression" circuitry is relatively simple and the majority of this system is composed of reconstitution circuitry.

If transmission of the output signal to a geographically remote area is desired, the signal is merely impressed upon a conventional data link. A second reconstitution circuit is connected at the other end to receive the output signal. The local reconstitution circuit and the remote reconstitution circuit are substantially identical. The signal transmitted over the data link is received by a second digital to analog converter as well as a second predictor. The second digital to analog converter generates an analog received difference signal reproduction which along with a remote predicted signal generated by the predictor is read by the second reconstitutor. The sum of these two signals is produced by the second reconstitutor as a received input signal reproduction which is the remote output for the system. This output is read by the second predictor as in the local end of the system.

The predictor employs an analog delay line made up of a series of sample and hold stages. Each sample and hold stage has a tap which feeds a correlation multiplier to generate a duty cycle signal through four-quadrant multiplication of the analog reconstituted input signal and the digital error signal. The predictor also uses integrators having a finite gain in the analog configuration to ensure against transmitter-receiver divergence and to provide immunity from moderate bit errors in the bit stream driving the receiver.

In the preferred embodiment of the invention, an absolute value detector is employed for scaling the predicted signal. The system must have scaling to follow amplitude variations in the input signal. The scaler reads the output of a flip-flop temporial quantizer and the first tap on the delay line and then feeds the first sample and hold stage of the delay line. In an alternative embodiment, the scaler reads the summed outputs of the correlation multipliers and the first tap of the delay line and feeds the comparitor.

Additionally, in the preferred embodiment, analog gates are employed in the multiplier stages to effect the four quadrant multiplication. An integrator is used for summing all of the feedback duty cycle signals within the predictor to the input of the delay line. Finally, there are eight sample and hold stages in the delay line, the output of each being used simultaneously in signal processing.

Various other features and advantages of this invention will become apparent upon a reading of the following specification, which taken with the patent drawings, describes and discloses a preferred illustrative embodiment of the invention in detail.

DETAILED DESCRIPTION OF THE INVENTION

Figure 1:
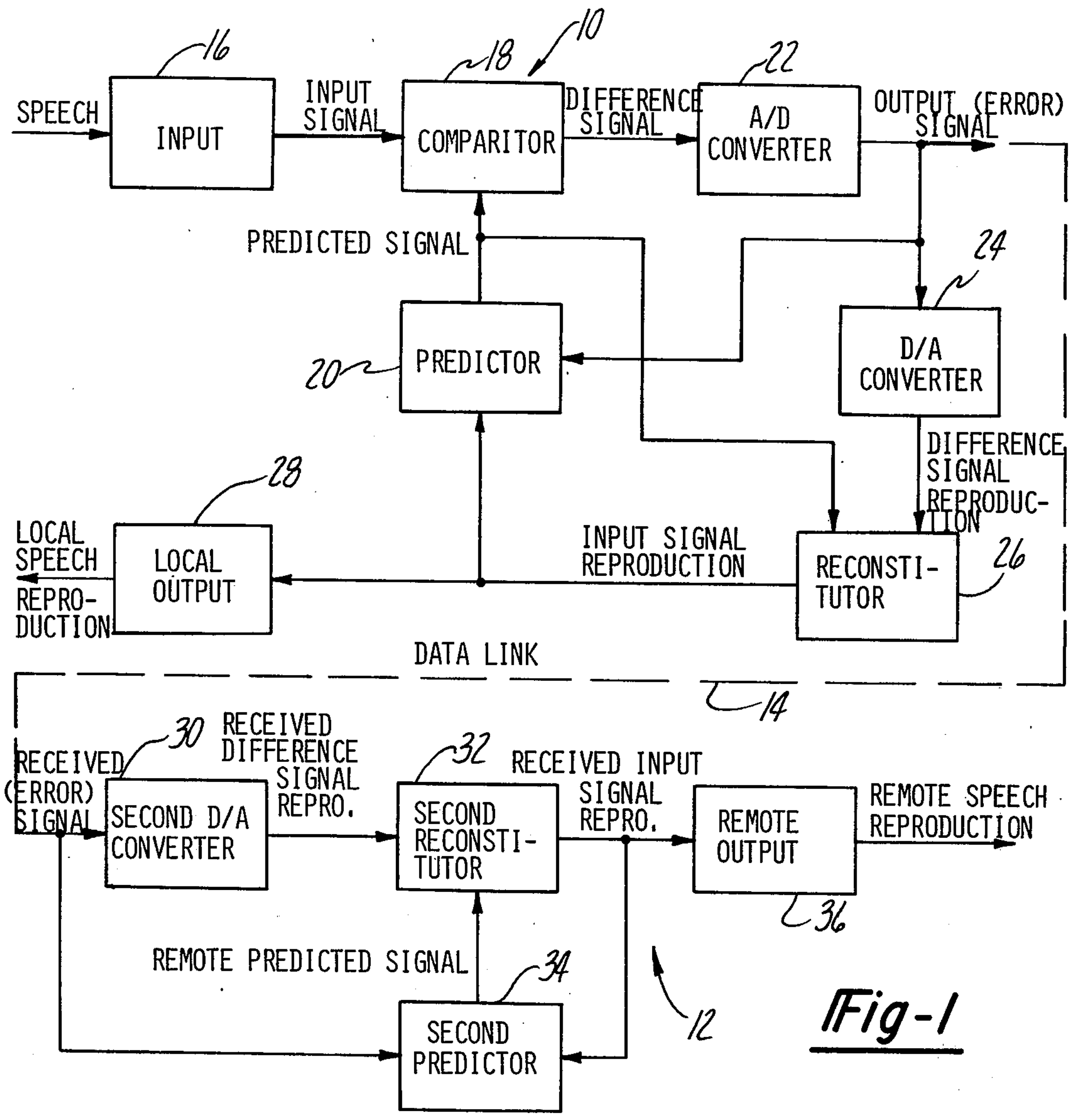
FIG. 1 is a simplified block diagram of the preferred embodiment of the invention.

FIG. 1 illustrates by block diagram a preferred embodiment of a speech transmission system incorporating an adaptive residual encoder for compression purposes. More precisely, the system is composed of a compressor 10 and an expander 12, the two being electrically interconnected by a conventional data link 14, such as a telephone cable or other relatively narrow band link. Speech is received by the input 16 which may be a microphone or the like and which in turn generates an electrical analog input signal. This input signal is fed electrically to a comparitor 18. A predictor 20 generates a predicted signal which is also received by the comparitor 18. The comparitor 18 is responsive to the received input signal and the predicted signal to generste an output signal representing the difference between the two. An analog to digital (A/D) converter 22 receives the analog difference signal and converts it to a digital error signal which is impressed on the data link 14. The error signal is the output of the compressor 10 portion of the speech transmission system, within the compressor 10, the error signal is also electrically fed to the predictor 20 as well as to a digital to analog (D/A) converter 24. The D/A converter 24 performs the reverse function of the A/D converter 22 and generates an analog difference signal reproduction. The difference signal reproduction is received by a reconstitutor 26. The reconstitutor 26 also receives the predicted signal from the predictor 20 and, in turn, generates an input signal reproduction which is substantially the sum of the predicted signal and the difference signal reproduction. The predictor 20 reads the input signal reproduction as well as the output signal and generates the predicted signal. The predictor is a tunable recursive filter which anticipates and predicts the input signal on the basis of the past output signal, i.e. the system is a spectral predictor which predicts the spectral redundancy of the input signal. If local reconstruction of the live speech is desired, a local output 28 such as a loud speaker is provided which reads the input signal reproduction and generates a sensible local speech reproduction which is substantially identical to the received or live speech.

If the system is to be used merely for speech compression and local storage and/or reproduction, the above-described system is all that need be implemented because the compressor 10 is primarily composed of expander circuitry which is substantially identical to the remote expander 12 as is described hereinbelow. However, if communication with and/or transmittal to a remote geographical location is desired, such as over a conventional data link 14, a separate expander 12 is required. The output signal of the compressor 10 in such a case is electrically impressed upon a conventional data link 14 and is received by a second D/A converter 30 at a point geographically remote from the compressor 10. This second D/A converter is identical to the D/A converter 24. The second D/A converter generates an analog received difference signal reproduction which is, in turn, received by a second reconstitutor 32. The received error signal is also electrically fed to a second predictor 34. The second predictor 34 generates a remote predicted signal which is electrically fed to a second predictor 34. The second predictor 34 generates a remote predicted signal which is electrically fed to the second reconstitutor 32. The second reconstitutor generates a received input signal reproduction which is substantially the sum of the received difference signal reproduction and the remote predicted signal. This received input signal reproduction is electrically fed to the second predictor 34 which is substantially identical to the local predictor 20. The received input signal reproduction is a faithful reconstitution of the input signal which is fed to remote output 36 such as a computer memory or a loud speaker operative to generate a live speech reproduction at the remote location.

It should be noted that the above described system is adapted for one-way communication between two geographically remote locations. However, it is contemplated that two such systems could be incorporated if a two-way communication channel were desired. Additionally, the compressor 10 is primarily composed of expander circuitry which is substantially identical to the remote expander 12. Although the preferred embodiment is described as a processor of live speech, it is contemplated that the invention could be employed for the compression and expansion of virtually any waveform including recorded and synthesizer speech.

Figure 2:
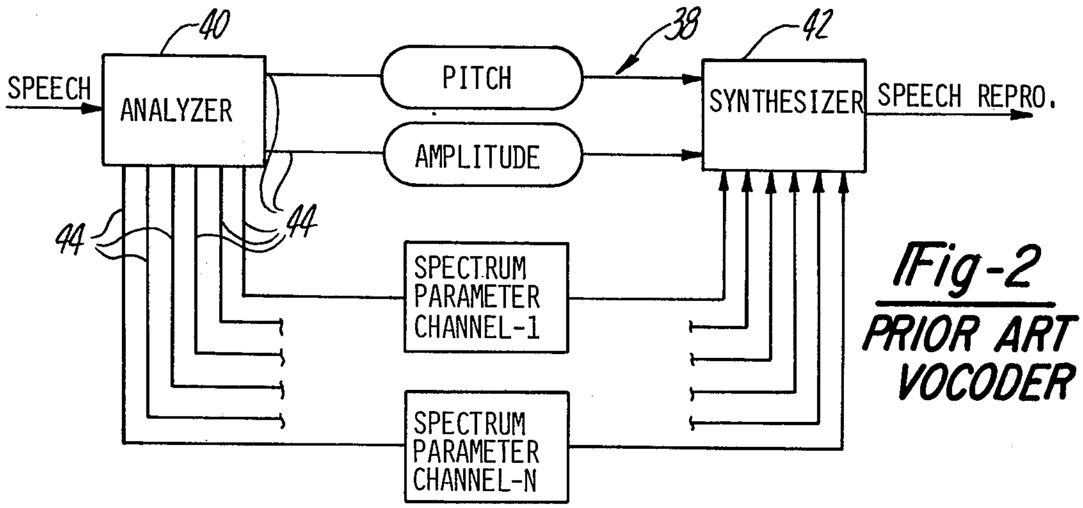
FIG. 2 is a block diagram of a prior art vocoder.

FIG. 2 illustrates in block diagram form a prior art vocoder 38. The vocoder is composed of an analyzer 40 at the transmission end and a synthesizer 42 at the receiving end. The analyzer 40 and synthesizer 42 are typically geographically remote from one another and are electrically connected by a number of parallel channels 44. The analyzer 40 receives live speech and reduces it to a number of distinct parameters, including pitch, amplitude and spectrum parameter information. Typically, eight spectrum parameter channels are required to transmit human utterances with an acceptable level of fidelity. At the receiving end, the synthesizer 42 receives each of these parallel channels 44 and reconstructs them to form a live speech reproduction.

The vocoder has the distinct disadvantage of requiring a large number of parallel lines of communication rather than a single data link 14 as in the present invention. Additionally, all of the parametric information must be transmitted over the transmission channel in order to obtain a live speech facsimile at the receiving end of the system. This system is substantially more complicated and expensive than the present invention as well as requiring relatively complex transmission media.

Conventional multiplexing techniques can be applied to the vocoder allowing transmission over a single communication channel. The use of multiplexing in such a system necessitates the use of extremely complex and expensive circuitry. Additionally, with multiplexing, transmitter and receiver synchronization becomes a problem necessitating even greater circuit complexity.

With or without the use of multiplexing, the vocoder has the basic drawback of requiring paramaterization of live speech and separate transmission, be it in parallel or sequentially, with each parameter being transmitted separately and independently of the others. In the present invention, only a single digital error output signal need be transmitted. This output signal is the difference between the live speech input signal and the predicted signal. In effect, each bit in the output signal contains all of the parametric information needed to reconstruct the input signal. The original speech waveform is reproduced entirely from the output signal without necessitating a vocal tract analog at the receiving end of the system.

Figure 3:
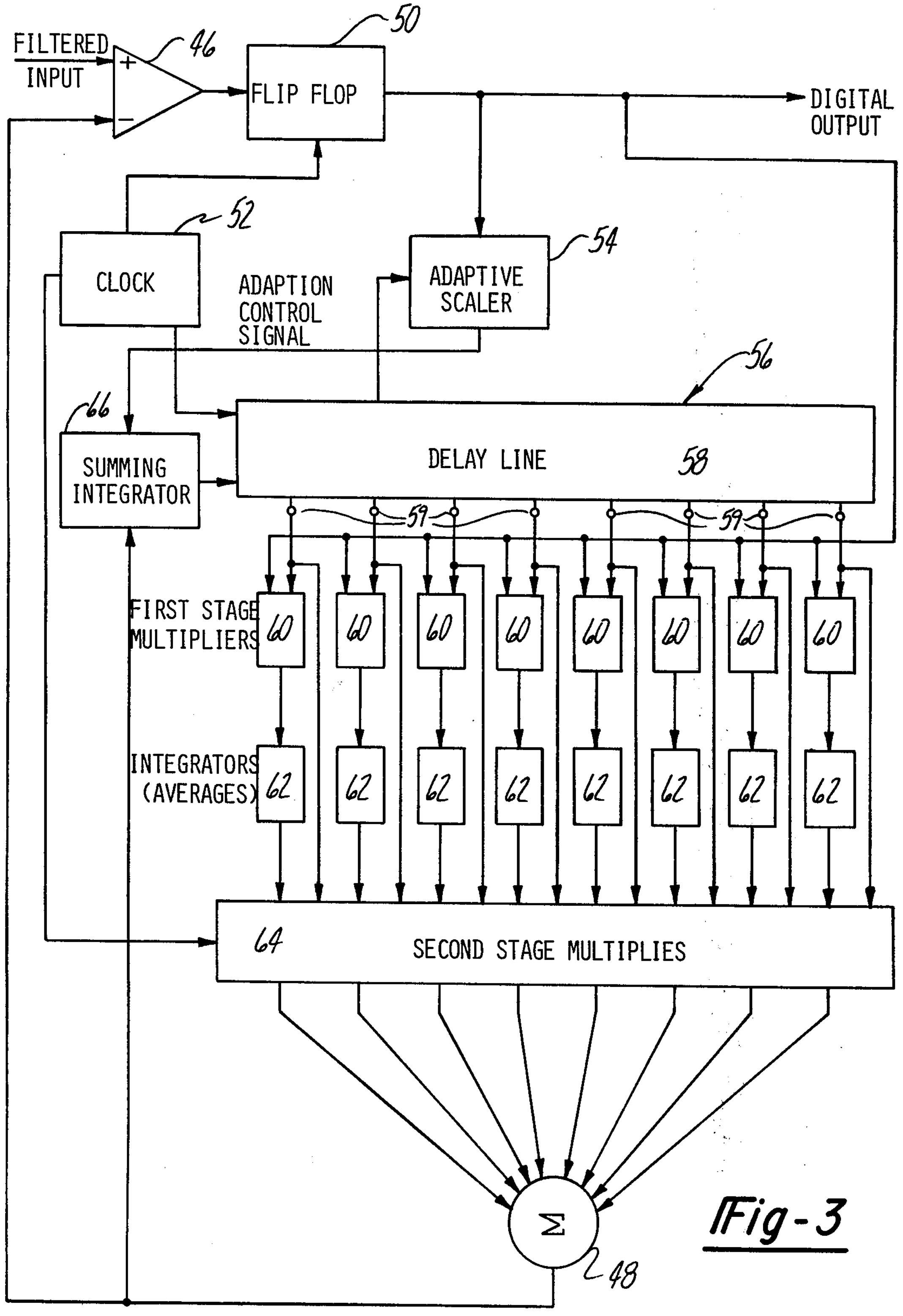
FIG. 3 is a block diagram of a preferred embodiment of the invention illustrating the predictor in greater detail.

Referring to FIG. 3, a block diagram of a preferred embodiment of the speech compressor is illustrated, depicting the predictor network. Filtered live speech is fed into the positive input of a comparator 46. The negative input of comparator 46 is fed by summing junction 48 of the predictor. The output of comparator 46 is electrically connected to a flip-flop 50 which serves as a temporal quantizer, establishing the sample rate of the system. The flip-flop output is the output for the compressor. A clock 52 drives the flip-flop 50. The output of flip-flop 50 is also electrically connected to an adaptive scaler network 54, to compensate for amplitude variations in the input signal.

A predictor 56 is made up of a delay line 58 which is a plurality of sample and hold modules, essentially an analog shift register, each having an output tap 59 electrically connected to a corresponding first stage multiplier 60. The first stage multipliers 60 each have a second input to receive the digital output stream or error signal from the output of flip-flop 50. The first stage multipliers 60 perform four quadrant multiplication of the digital error signal and the analog sample and hold tap signal which is integrated via integrators 62 and finally fed to second stage multipliers 64. The taps 59 of each sample and hold module of the delay line 58 are also fed to the corresponding second stage multiplier 64 where four-quadrant multiplication is again performed between the integrator outputs and the tap 59 outputs from the corresponding sample and hold modules. The outputs of the second stage multipliers are summed and fed to the negative input of comparator 46. The summed output is also fed back to a summing integrator 66. An output from the adaptive scaler 54 feeds the adaptation control signal to summing integrator 66. The summing integrator 66 is controlled by the clock 52, the operational details of which will be described in detail below.

The adaptive scaler 54 has a second input from one of the sample and hold stages of delay line 58 which is a slowly varying DC signal. The resulting output of the adaptive scaler 54 is an analog signal having a flip-flop or bi-polar waveform. In other words, after passing through the adaptive scaler 54, the flip-flop 50 output varies in amplitude according to a slowly varying DC signal.

Figure 3A:
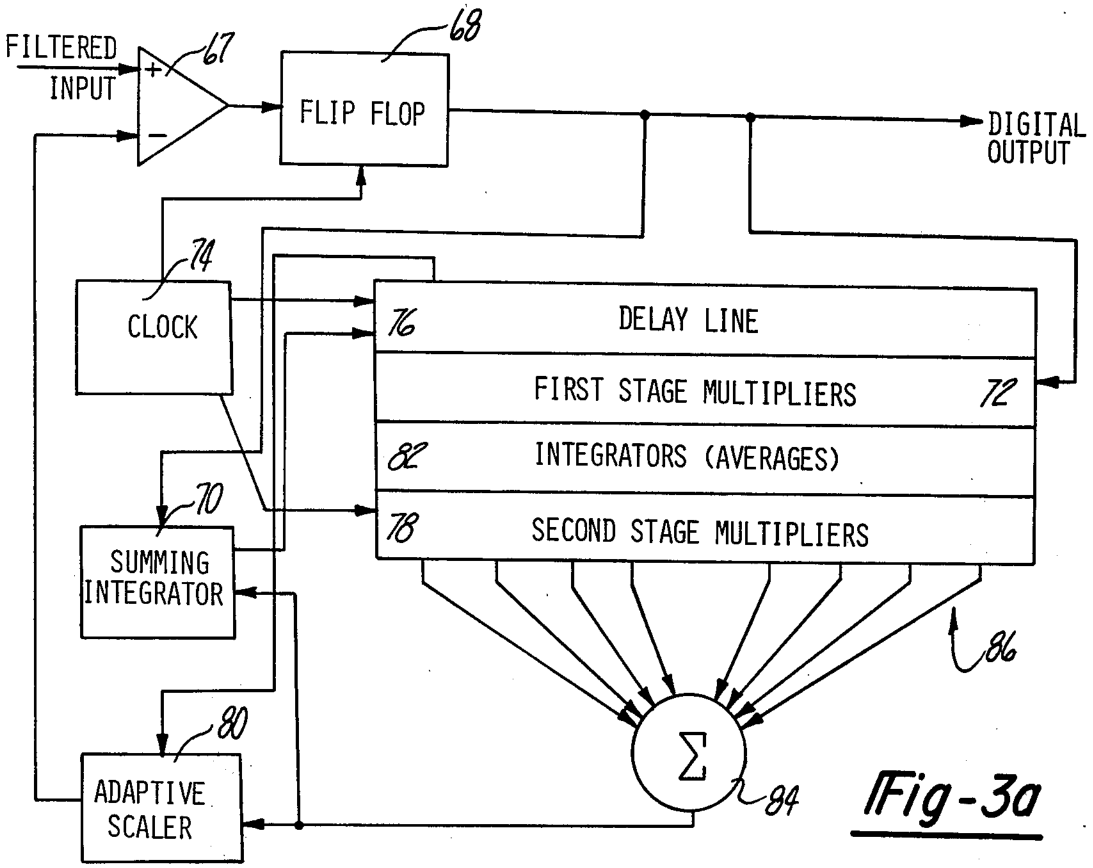
FIG. 3A is a block diagram of an alternative embodiment of the predictor.

Referring to FIG. 3A, an alternative embodiment of the compressor portion of the invention is shown in block diagram. The alternative embodiment may be substituted for the embodiment illustrated in FIG. 3. A filtered input signal is received at the positive terminal of a comparator 67, the output of which feeds a flip-flop 68. The output of flip-flop 68 is the data stream which is transmitted over the data link. The output of the flip-flop is fed directly to a summing integrator 70 as well as first stage multipliers 72. The summing integrator 70 and a clock 74 feed the delay line 76 as described above. Additionally, the clock 74 drives flip-flop 68 as well as second stage multipliers 78. The summed outputs of the second stage multipliers 78 are fed to an adaptive scaler 80 as well as the summing integrator 70. The output of the adaptive scaler is fed to the negative input of comparator 66. The predictor comprises integrators 82 and a summing junction 84 as well as the delay line, first stage multipliers and second stage multipliers 76, 72 and 78 respectively as was hereinabove described. Because the error signal to the summing integrator 70 is not scaled, the signal to noise ratio of the system is improved and the predictor 86 operates more efficiently due to the uniform scaling of the signal fed to the delay line 76.

Figure 4C:
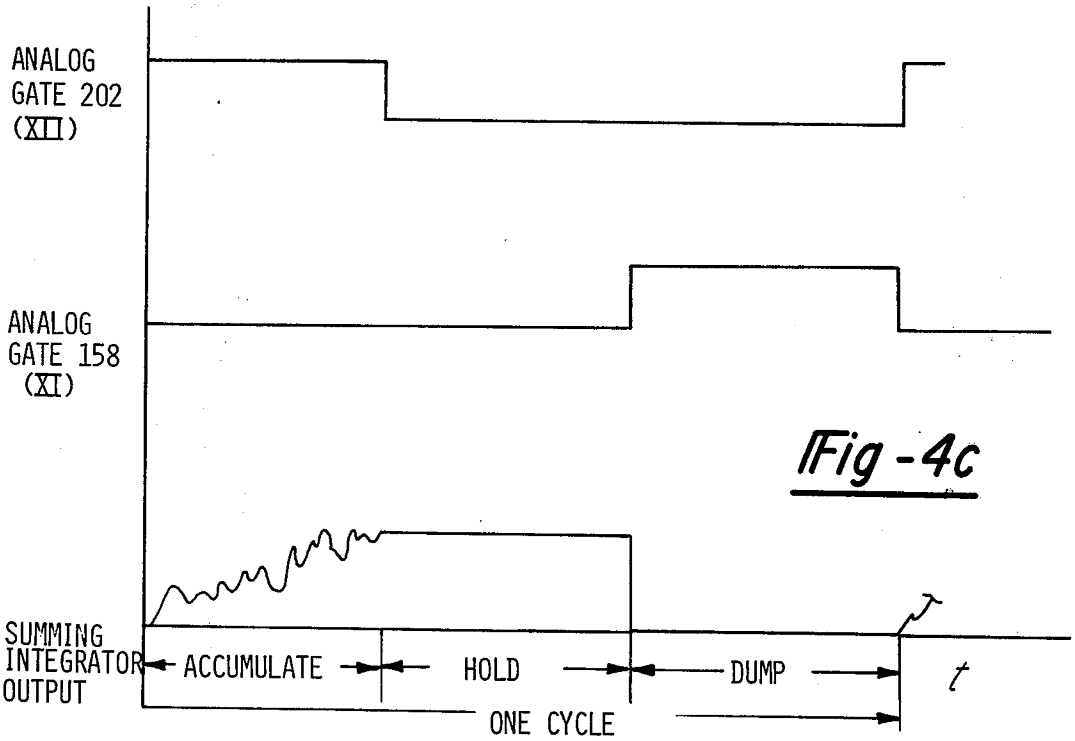
FIG. 4C shows timing waveforms which are useful in describing the operation of the circuit illustrated in FIGS. 4A and 4B.
Figure 4A:
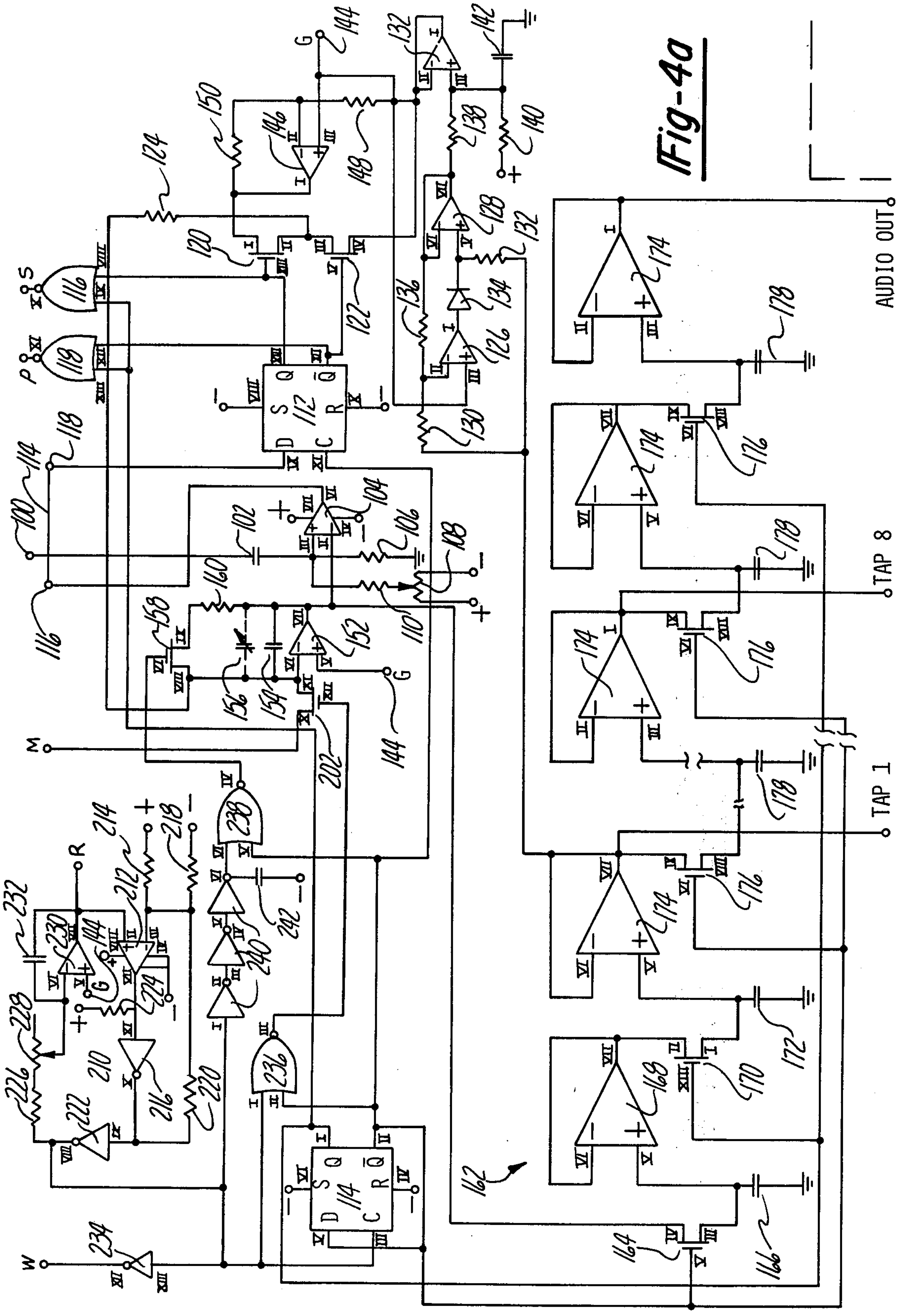
FIG. 4A is a partial schematic diagram of the invention.
Figure 4B:
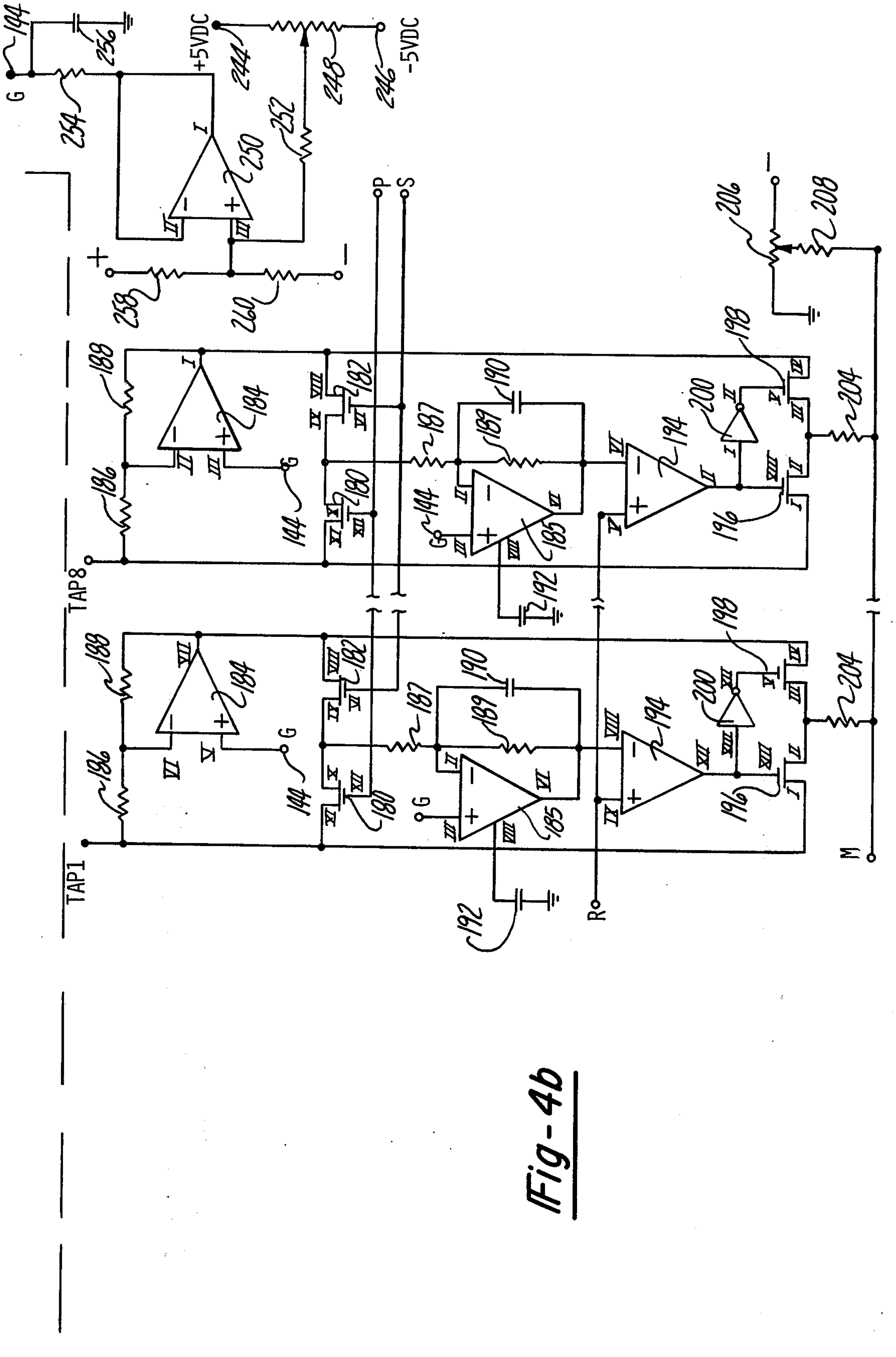
FIG. 4B is the balance of the schematic diagram for the preferred embodiment of the invention.

Referring to FIGS. 4A and B, a schematic diagram of a preferred embodiment of the compressor is illustrated. Note that because each sample and hold stage in the delay line as well as their associated first multipliers, integrators and second multipliers are identical, only two of the complete stages have been illustrated. Additionally, although eight such stages have been employed in the preferred embodiment of the invention, it is contemplated that fewer or more could be used depending upon the system application. The audio input signal is fed into terminal 100 through a 0.01 mf filter capacitor 102 to the positive input terminal III of a type 1709 comparator 104. The device actually employed is a type 709 uncompensated operational amplifier (OP AMP), but it is contemplated that others well known in the art could be substituted. The positive input of comparator 104 is also connected to ground through a 10K reference resistor 106. Furthermore, the positive terminal III of comparator 104 is fed to the wiper of a variable input bias 10K resistor 108 through a series 180K current limiting resistor 110. The end terminals of variable resistor 108 are fed to a positive and negative 5VDC dual tracking regulated power supply which will be described in detail below. Note that in this specification terminals denoted with a positive symbol represent connection with the positive 5VDC power supply and terminals designated with a negative symbol connotate connection with a negative 5VDC power supply. Terminals VII and IV of comparator 104 are connected to the positive and negative 5VDC power supplies respectively. In the specific device employed in the preferred embodiment, the positive terminal of the comparator is designated terminal III and the negative terminal is designated terminal II. The terminals designated by Roman Numerals in this specification are those specifically denoted by the manufacturer of the actual devices employed in the preferred embodiment. It is contemplated that other devices with different terminal designations that are well known to artisans could be substituted. The output of comparator 104 is labeled VI and is electrically connected to the data input terminal IX of a type 4013 CMOS flip-flop 112 through a jumper connector 114 bridging terminals 116 and 118. The significance of jumper 114 will be described below. Terminals VIII and X of flip-flop 112 are both electrically connected to the −5VDC power supply. The clock input terminal XI of flip-flop 112 is electrically fed by the $\overline{Q}$ output terminal II of clock flip-flop 114.

The Q and $\overline{Q}$ outputs of flip-flop 112 are electrically connected to one of the inputs of NOR gates 116 and 118 respectively. The Q and $\overline{Q}$ outputs of flip-flop 112 are also connected to the gate terminals XIII and V of type 4066 analog gates 120 and 122 respectively. The drains of analog gates 120 and 122 are electrically interconnected to one another and to the input of the summing integrator through a series 68.1K precision resistor 124. The remaining inputs of NOR gates 116 and 118 are electrically connected with the Q output terminal I of flip-flop 114. The output terminals of NOR gates 116 and 118 labeled S (X) and T (XI), respectively, are the data outputs of the system, one of which would be connected to a data link if transmission of utterances to a geographically remote location was desired. In operation, the data output at terminals P and S are complements. The data is transmitted through NOR gates 116 and 118 to assure a user that he is receiving valid data and if no valid data is being transmitted both will be off.

The adaptive scaler is composed principally of three Op Amps 126, 128 and 132. Op Amps 126 and 128 and their associated discrete components constitute an absolute value detector and perform full wave rectification. An adaptation control signal is received from the hold stage of the first sample and hold module in the delay line, the details of which will be described in detail hereinbelow. This adaptation control signal is fed to the negative input terminal II of Op Amp 126 through a series 20K resistor 130. The signal is also fed to the positive input terminal V of Op Amp 128 through a series 10K resistor 132. The operational theory of an absolute value detector is well known in the art and will not be elaborated upon here. The output terminal I of Op Amp 126 is fed to the positive input terminal V of Op Amp 128 through a series type 419 diode 134. The output terminal VII of Op Amp 128 is fed back directly to the negative input terminal VI of Op Amp 128 as well as to the negative input terminal II of Op Amp 126 through a series 20K resistor 136. The output of Op Amp 128 is fed to the positive input terminal III of an Op Amp 132 through a series 10K resistor 138. Terminal III of Op Amp 132 is also connected to the positive 5VDC power supply through a 1 meg offset resistor 140. Resistor 140 assures the presence of an offset voltage for system start-up purposes. Terminal III of Op Amp 132 is also electrically connected to ground through a series 0.47 mf capacitor 142. The ratio of resistor 140 and capacitor 142 determines the time constant for the absolute value averaging.

Output terminal I of Op Amp 132 is fed directly back to the negative input terminal II of Op Amp 132. The positive input III of Op Amp 126 is electrically connected to a derived ground point G at terminal 144 which will be described in detail hereinbelow. The rectified averaged output of tap 1 of the first sample and hold module is then electrically fed directly to the source terminal IV of analog gate 122 and to the source terminal I of analog gate 120 through an inverter section. The inverter is made up of operational amplifier 146 and its associated discrete components. A 10K series resistor 148 interconnects the output terminal I of Op Amp 132 and the negative input terminal II of Op Amp 146. The positive input terminal III of Op Amp 146 is connected to the derived ground 144. The output terminal I of Op Amp 146 is connected to its negative input terminal II through a 10K feedback resistor. The output terminal I of Op Amp 146 is also electrically connected to source terminal I of analog gate 120. Thus, the output of the absolute value detector and its inversion are applied to the analog gate pair 120 and 122 which scale the amplitude of the digital residual signal applied through the resistor 124 to the input of the delay line via the input sample and hold integrator.

The summing integrator is comprised of Op Amp 152 and its associated discrete components. The output of the adaptive scaler is fed to the negative input terminal VI of Op Amp 152. The positive input of Op Amp 152 is electrically connected to derived ground 144. The integrator feed-back network has a fixed capacitor 154 and a parallel variable capacitor 156, the effective capacitance of the pair being 2,000 pf. The output terminal VII of Op Amp 152 is also connected to the drain terminal IX of analog gate 158 through a series 1K resistor 160. The source terminal VIII of analog gate 158 is connected to the negative input terminal VI of Op Amp 152. The output terminal VII of Op Amp 152 and thus the output of the summing integrator is electrically connected to the negative input terminal II of Op Amp 104. Additionally, the output terminal VII of Op Amp 152 is connected to the input of the delay line 162. Although the summing integrator is not needed for the error signal, it is needed for other signals which are summed into this point of the circuit as will be described in detail below.

The delay line 162 is a series of sample and hold modules. An analog gate is used to charge a capacitor whose voltage is continuously monitored by a voltage follower Op Amp. This buffered output is then available to drive the next sample and hold stage in the delay line 162. The control gates of all odd numbered stages are driven by the $\overline{Q}$ output of flip-flop 114 while the even numbered stages are driven by the Q output of the same flip-flop. It takes two such stages to make one bit delay. Thus, the delay line of 16 stages produces an 8 stage delay when referenced to the input sampling rate. Eight stages is considered optimal when balancing the system's fidelity and cost, but it is contemplated that more or fewer stages could be employed depending upon the application. Each of the eight stages of delay provides an output tap which is used for signal processing. Because all taps are processed identically, a thorough disclosure of only one is necessary. The output of terminal VII of Op Amp 152 is electrically connected to the source terminal IV of a type 4016 S analog gate 164. Drain terminal III of gate 164 is connected to ground through a series 0.01 pf capacitor 166. Terminal III of gate 164 is also electrically connected to the positive input terminal V of a voltage follower Op Amp 168. The output terminal VII of Op Amp 168 is electrically connected to its own negative input terminal VI as well as to the source terminal II of an analog gate 170. The drain terminal I of analog gate 170 is connected to ground through a 0.01 pf capacitor 172. The gate terminal V of analog gate 164 is electrically connected to the $\bar{Q}$ output terminal II of flip-flop 114. The gate terminal XIII of analog gate 170 is electrically connected to the Q output terminal I of flip-flop 114. The gate terminal V of analog gate 164 is also electrically connected to the data input terminal V of flip-flop 114. The drain terminal I of analog gate 170 is electrically connected to the positive input terminal V of a second voltage follower Op Amp 174. Output terminal VII is electrically connected to the negative input terminal VI of Op Amp 174. Output terminal VII of Op Amp 174 is electrically connected to the positive input terminal V of Op Amp 128 through series resistor 132 as hereinabove described. Additionally, the output terminal VII of Op Amp 174 is connected to the source terminal IX of analog gate 176 whose drain terminal VIII is connected to ground through 0.01 pf capacitor 178. Gate terminal VI of analog gate 176 is electrically connected to the $\bar{Q}$ output terminal II of flip-flop 114. The seven succeeding sample and hold stages are identical to the first stage described above. The taps are derived from the output terminal of the hold Op Amp in each stage. For example, in stage one, the output terminal VII of Op Amp 174 is the source of tap No. 1. An optional ninth sample and hold stage is illustrated to provide a local audio output signal for situations where it is not desirable to derive the signal from one of the first eight stages. It is contemplated that the audio output can be taken from any tap in the delay line as its contents are the same in all taps except for slight time delays.

A tap and its inversion are both needed by the first multiplier stages. Tap 1 is fed to the source terminal XI of an analog gate 180 and through an inverting section to the source terminal VIII of a second analog gate 182. The inverter comprises a type 4558S Op Amp 184. Tap 1 is connected to the negative input terminal VI of Op Amp 184 through a 10K series resistor 186. The positive input terminal V of the Op Amp 184 is connected to derived ground 144. A 10K feedback resistor 188 interconnects input terminal VI and output terminal VII of Op Amp 184.

Data output terminals P and S are electrically connected to gate terminals XII and VI of analog gates 180 and 182, respectively. In each stage, the tap output is thereby multiplied or correlated with the output digital stream at terminals P and S. This function is the four-quadrant multiplication of an analog signal with the digital output signal of the system. The P data output terminal is connected with each analog gate whose source terminal is directly connected to a tap, such as analog gate 180 and terminal S is electrically connected to the gate terminals of all analog gates in the first stage multipliers which have their source gate connected to the tap through an inverting section, such as analog gate 182. The drain terminals X and IX of analog gates 180 and 182 respectively are interconnected with one another and feed the negative input terminal II of an Op Amp 185 through a series 100K resistor 187. Op Amp 185 is a type 308S which, with its associated discrete components, compreses a "leaky" integrator having a DC gain of 10. The positive input terminal III of Op Amp 185 is connected to derived ground 144. The output terminal VI of Op Amp 185 feeds back to the negative input terminal II through a parallel combination of a 1 Meg resistor 189 and a 0.056 mf capacitor 190. Terminal VIII of Op Amp 185 is connected to ground through a 100 pf compensation capacitor 192. The reason ideal integrators are not employed is that any attempt to make a receiver track a transmitter would result in failure caused by inevitable divergence of the integrators in the transmitter and receiver. The output of the integrator is a slowly varying DC voltage. The integrator output terminal VI of the Op Amp 185 is electrically connected to the negative input terminal VIII of another Op Amp 194. Op Amp 194 functions as a duty cycle generator which converts these slowly varying DC voltages into duty cycles. The positive input terminal IX of Op Amp 194 is connected to a bipolar sawtooth waveform generator, the details of which will be described below. The duty cycles are necessary for the second multiplier stage and are generated by comparing the DC voltage with the 12 KHz triangle waveform from the clock oscillator.

The second multiplier then multiplies the delay line tap output and its inversion by the duty cycle or reflection coefficient representing the integrator output, resulting in a second four-quadrant multiplication. Tap 1 is directly connected to the source terminal I of a type 4016 analog gate 196. The inverted tap signal is fed to source terminal IV of a second type 4016 analog gate 198. The output terminal XII of Op Amp 194 is connected directly to the gate terminal XIII of analog gate 196 into gate terminal V of analog gate 198 through an invertor 200. The drain terminals II and III of analog gates 196 and 198 respectively are electrically connected to one another. This point of connection is the output of the second multiplier.

The outputs of all of the second multipliers are then summed in a summing junction at terminal M through 20K series resistors 204. This summed signal is then electrically connected to the sample and hold summing integrator, where it is fed back into the input of the delay line. Terminal M is electrically connected to the source terminal X of a type 4066 analog gate 202. The drain terminal XI of analog gate 202 is electrically connected to the negative input terminal VI of integrator Op Amp 152.

In operation, the delay line contents is correlated with the residual digital bit stream. These correlations are averaged to produce a correlation coefficient at the output of the integrators. These coefficients are operating through the second multipliers and determine how much of the signal, i.e. what fraction from $-1$ to $+1$ of each tap is fed back to the input. The system is essentially an eight stage recursive or tunable filter which is continuously tuned to match the correlation statistics of the input signal, thus enhancing its signal to noise ratio over a system with only one bit of resolution and without any prediction. This is a spectral predictor which predicts the spectral redundancy of the input signal. In most situations, due to the characteristics of human speech, the pitch will be the most predominant feature in the bit stream, the spectral or resinant terms being largely predicted by the predictor.

The drain terminal II of gate 196 and drain terminal III of gate 198 are electrically interconnected with each other as well as with terminal M through a series 20K resistor 204. The resistor 204 along with the capacitors 154 and 165 determine the time constant for the summing integrator. The system demodulation bias is controlled by a 10K variable resistor 206 whose end terminals are interconnected between the $-5$ VDC power supply and ground. The wiper of the variable resistor is connected to terminal M through a series 680K resistor 208. The demodulation adjustment insures that any cumulative offsets in the integrators is nulled out, as evidenced by the presence of residual outputs in the receiver with no input. The input bias adjustment on the signal input assures minimum background noise while idling with no input applied.

A clock oscillator 210 provides the system timing function. The clock is made of a type 311 Op Amp 212. The negative input terminal III of Op Amp 212 is electrically connected to the +5 VDC power supply through a series 4.99K resistor 214. The positive input terminal II of Op Amp 212 is electrically connected to terminal R and thus the positive input terminal IX of duty cycle generator Op Amp 194. Terminal VIII of Op Amp 212 is connected to +5 VDC power supply and terminals I and IV are connected to the −5 VDC power supply. Output terminal VII of Op Amp 212 is connected to a type 4069 inverter which in turn is electrically connected to the negative input terminal III of Op Amp 212 through a series 20K resistor 220. The input terminal III of Op Amp 212 is also electrically connected to the −5 VDC power supply through a 4.99K series resistor 218. The output terminal X of inverter 216 is electrically connected to the input terminal IX of a second inverter 222. The output terminal VIII of inverter 222 is electrically connected to the clock input terminal III of flip-flop 114. Output terminal VII of Op Amp 212 is electrically connected to the +5 VDC power supply through a 2.2K resistor 224. The output terminal VIII of inverter 222 is electrically connected to a series combination of a fixed 15K resistor 226 and one of the end terminals of a variable 20K resistor 228. The wiper of variable resistor 228 is electrically connected to the negative input terminal VI of an Op Amp 230. The positive input V of Op Amp 230 is electrically connected to derived ground 144. The output terminal VII of Op Amp 230 is electrically connected to terminal R as well as to a 0.00755 mf feedback capacitor 232. Capacitor 232 is electrically interconnected between input terminal VI and output terminal VII of Op Amp 230. The variable resistor 228 sets the clock frequency, which at terminal R is a bipolar sawtooth. As described above, this sawtooth waveform is impressed on the negative input terminals of the duty cycle generators 194. The output terminal VIII of inverter 222 is electrically connected to terminal W through another inverter 234. Terminal W is available to provide a signal to external equipment indicating data validity.

In the preferred embodiment, the oscillator clock rate is 12.8 KHz which is twice the system bit rate. The clock oscillator output also electrically feeds one of the inputs I of a type 4001 NOR gate 236, as well as to one of the inputs as a second type 4001 NOR gate 238 through in series combination of three type 4069 inverters 240 which provide a digital delay function. The output terminal VI of the third inverter 240 is electrically connected to the −5 VDC power supply to a 0.001 mf capacitor 242. The $\overline{Q}$ input terminal II of flip-flop 114 drives the remaining inputs terminals II and V of NOR gates 236 and 238, respectively. The output terminal III of NOR gate 236 is electrically connected to the gate terminal XII of analog gate 202 and the output terminal IV of NOR gate 238 is electrically connected to the gate terminal VI of analog gate 158. The combined, summed output of the second stage multipliers are electrically connected to terminal M and thus to terminal X of analog gate 202.

Referring to FIG. 4C, the waveform of the summing integrator output is illustrated over one cycle. Each cycle can be broken down into three distinct segments. The first being when analog gate 202 is being pulsed, the integrator accumulates the outputs from the predictor as well as the error data stream. When analog gate 202 is shut off, the accumulation stops and the final accumulated value is held until gate 158 is pulsed. At that time, the integrator output is zeroed until analog gate 158 is switched off and analog gate 202 is turned on, beginning a new cycle.

The system bit rate is normally 6.0 or 6.4 KHz, but the system can work at a rate as low as 4.8 KHz with some performance degradation if the effective value of integrator capacitors 154 and 156 are increased to 2,700 pf. The value of the capacitors are inversely proportional to the sampling rate at all sampling frequencies of interest. The system, for instance, will work with improved fidelity at a bit rate of 9.6 KHz with this capacitor at 1,300 pf.

The derived ground is the concept well known in the art and its operational theory will not be elaborated upon here. In the preferred embodiment of the invention, the derived ground is achieved by the interconnection of a +5 VDC power supply 244 and the −5 VDC power supply 246 with the end taps of a 20K variable resistor 248. The wiper of the resistor 248 is connected to the positive input terminal III of an Op Amp 250 in a voltage follower configuration through a 470K series resistor 252. The output terminal I of Op Amp 250 is a direct feedback to the negative input II. The output terminal I of Op Amp 250 is electrically connected to the derived ground point terminal 144 through a series 470 ohm resistor 254. Derived ground point 144 is also electrically connected to ground through a 10 mf capacitor 256. The derived ground assures that the system ground will always be between the potential of the two power supplies. The positive input III is also connected to the +5 VDC power supply and the −5 VDC power supply through 10K resistors 258 and 260 respectively.

A receiver or expander for this system which would be located at a point geographically remote from the compressor having a data link interconnecting the two would be substantially identical to the circuit disclosed in FIGS. 4A and B. It is obvious that almost the entire module is composed of expander. The receiver consists of virtually all of the stages noted above. To separate the receiver from the rest of the schematic, all need be done is to remove jumper connector 114 between terminals 116 and 118 and apply the residual or error bit stream to terminal 118.

BRIEF DESCRIPTION OF OPERATION

In operation, an input signal is received at terminal 100, is filtered and fed into one of the inputs of a comparator 104. A predicted signal which is an estimate of the input signals next value is fed into the other input of comparator 104. The predicted value is the integrated sum of the digital error signal and the summed outputs of the correlation multipliers within the predictor. If the predicted value exactly matches the input signal, the comparator, and thus the compressor portion of the system, would have no output. Because the pitch, amplitude and frequency components of human speech vary rapidly, there will typically be an error signal. When the predicted value does not match the input signal, the comparator 104 will have an output which is temporily quantized by flip-flop 112. The Q and $\overline{Q}$ outputs of flip-flop 112 serve as the data output of the compressor portion of the compressed speech system.

When the predicted signal is being fed to the comparitor, it is also being fed into the first sample and hold stage of the delay line which operates like an analog shift register. Thus, the contents of each sample and hold stage within the delay line will be identical with the exception that they are time displaced from one another by a rate determined by the 12.8 KHz oscillator clock.

Each hold stage in the delay line feeds an output tap. The tap signal and its inversion are both needed by the first multiplier stages. In these stages each tap output is multiplied or correlated with the output digital stream at terminals P and S. This function is the four-quadrant multiplication of the analog signal with the digital signal output of the system. The output of the first stage multiplier is then integrated to produce slowly varying DC voltages. Each slowly varying DC voltage is fed into one input of a comparator, the other input of which is fed by a 12 KHz triangle waveform from the clock oscillator. The output of the comparator is the duty cycle which is necessary for second stage multiplication. The duty cycle reflection coefficient is multiplied with the analog tap contents and its inverse resulting in a second four-quadrant multiplication. The output of all of the second multipliers are summed and fed back to the sample and hold integrator for reinsertion into the delay line. The delay line contents are thereby correlated with the residual bit stream. The recursive filter is continuously tuned to match the correlation statistics of the input signal. Because of the great amount of redundancy in human speech the speech pitch information will be the predominate remainder in the bit stream.

The first tap of the delay line is monitored by an absolute value detector, the output of which and its inverse are fed to a pair of analog gates being triggered by the Q and $\bar{Q}$ outputs of flip-flop 112. This provides scaling which the system must have to follow amplitude variations in the input signal. The clock oscillator, derived ground and demodulated bias adjustment involve well known techniques and do not require elaboration as to their operation.

It is to be understood that the invention has been described with reference to a specific embodiment which provides the features and advantages as previously described, and that such specific embodiment is susceptible of modification as will be apparent to those skilled in the art. Accordingly, the foregoing description is not to be construed in a limiting sense.

The embodiments of the invention in which an exclusive property or privilege is claimed are defined as follows:

1. A predictor for use in a compressed speech system of the type which reduces speech to a minimum of binary digits through the prediction of redundency in said speech, said system having an output signal characterized by a stream of binary digits, said predictor comprising:

a delay line composed of a plurality of serially arranged analog sample and hold modules, each said module having an output tap, the first said module being operative to receive a predicted signal and to transmit said signal serially to each succeeding module at a predetermined rate;

a plurality of correlation multipliers, one said multiplier corresponding with each module, each said multiplier operative to receive the predicted signal from said corresponding tap and to generate a multiplier output signal as a function of the product of four-quadrant multiplication of said binary output signal and said predicted signal;

and summation means operative to receive said multiplier output signals and to generate said predicted signal as a function thereof.

2. Apparatus as described in claim 1 wherein said correlation multipliers each comprise a first multiplier, a leaky integrator, a duty cycle generator and a second multiplier, said first and second multipliers being composed of analog gate pairs operative to perform said four-quadrant multiplication.

* * * * *